(12) United States Patent
Chang et al.

(10) Patent No.: US 11,558,870 B2
(45) Date of Patent: Jan. 17, 2023

(54) METHOD AND DEVICE FOR PROCESSING CARRIER ACTIVATION

(71) Applicants: Sharp Kabushiki Kaisha, Sakai (JP); FG Innovation Company Limited, Tuen Mun (HK)

(72) Inventors: Ningjuan Chang, Shanghai (CN); Renmao Liu, Shanghai (CN); Fangying Xiao, Shanghai (CN)

(73) Assignees: SHARP KABUSHIKI KAISHA, Sakai (JP); FG INNOVATION COMPANY LIMITED, New Territories (HK)

(*) Notice: Subject to any disclaimer, the term of this patent is extended or adjusted under 35 U.S.C. 154(b) by 74 days.

(21) Appl. No.: 16/763,326

(22) PCT Filed: Nov. 15, 2018

(86) PCT No.: PCT/CN2018/115680
§ 371 (c)(1),
(2) Date: May 12, 2020

(87) PCT Pub. No.: WO2019/096214
PCT Pub. Date: May 23, 2019

(65) Prior Publication Data
US 2020/0337051 A1    Oct. 22, 2020

(30) Foreign Application Priority Data
Nov. 16, 2017   (CN) .......................... 201711141744.5

(51) Int. Cl.
*H04W 72/04* (2009.01)
*H04W 74/08* (2009.01)

(52) U.S. Cl.
CPC ..... *H04W 72/0453* (2013.01); *H04W 72/042* (2013.01); *H04W 74/0833* (2013.01)

(58) Field of Classification Search
CPC . H04W 72/04; H04W 74/08; H04W 72/0453; H04W 74/0833; H04W 72/042
See application file for complete search history.

(56) References Cited

U.S. PATENT DOCUMENTS

2013/0182668 A1    7/2013  Xu et al.
2019/0132845 A1*   5/2019  Babaei .................. H04L 5/0098
(Continued)

FOREIGN PATENT DOCUMENTS

| CN | 102271415 A | 12/2011 |
| CN | 103081553 A | 5/2013 |
| WO | 2012/040892 A1 | 4/2012 |

OTHER PUBLICATIONS

Official Communication issued in International Patent Application No. PCT/CN2018/115680, dated Feb. 2, 2019.
(Continued)

*Primary Examiner* — Chi Ho A Lee
(74) *Attorney, Agent, or Firm* — Keating & Bennett, LLP

(57) ABSTRACT

The present disclosure provides a method for processing carrier activation at user equipment (UE) and a corresponding device. The method implemented at the user equipment comprises: acquiring an indication related to deactivation of a currently activated carrier, wherein the carrier is a carrier in a carrier group consisting of a plurality of carriers; and if a random access procedure is ongoing, then ignoring the indication.

5 Claims, 3 Drawing Sheets

---

100

ACQUIRE AN INDICATION RELATED TO DEACTIVATION OF A CURRENTLY ACTIVATED CARRIER — S110

IF A RANDOM ACCESS PROCEDURE IS CURRENTLY BEING EXECUTED, IGNORE THE INDICATION — S120

(56) References Cited

U.S. PATENT DOCUMENTS

| | | | | |
|---|---|---|---|---|
| 2019/0132855 A1* | 5/2019 | Lee | .................. | H04W 72/1268 |
| 2019/0152695 A1* | 5/2019 | Wegner | ................ | B65F 1/1646 |
| 2019/0364602 A1* | 11/2019 | Yi | ..................... | H04W 72/1278 |
| 2020/0288502 A1* | 9/2020 | Lee | .................. | H04W 74/0833 |
| 2020/0305097 A1* | 9/2020 | Bergquist | ............ | H04W 56/001 |
| 2020/0351946 A1* | 11/2020 | Pang | .................. | H04W 74/006 |

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.

"3rd Generation Partnership Project; Technical Specification Group Radio Access Network; NR; Physical channels and modulation (Release 15)", 3GPP TS 38.211 V1.0.0, Sep. 2017, pp. 1-37.

Huawei et al., "User plane impacts for Bandwidth Parts", 3GPP TSG-RAN WG2 #99bis, R2-1710217, Oct. 9-13, 2017, 6 pages.

Samsung, "On Bandwidth Part Operation", 3GPP TSG RAN WG1 NR Ad-Hoc#3, R1-1716019, Sep. 18-21, 2017, 5 pages.

\* cited by examiner

METHOD AND DEVICE FOR PROCESSING CARRIER ACTIVATION

CROSS-REFERENCE TO RELATED APPLICATIONS

The present application claims the priority of Chinese patent application (Application No. 201711141744.5) entitled "Method and Device for Processing Carrier Activation" filed on Nov. 16, 2017, which is incorporated herein by reference in its entirety.

TECHNICAL FIELD

The present disclosure relates to the technical field of mobile communication, and more particularly, to a method and device for processing carrier activation.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

In NR, providing adaptive adjustment to the frequency band size of user equipment (UE) by dividing a wideband carrier with a large bandwidth into a plurality of bandwidth parts is supported. The UE can also be configured with one or a plurality of bandwidth parts, which may be in an activated state or a deactivated state under network side-based control.

However, in the prior art, solutions to activate/deactivate bandwidth parts in a specific scenario (e.g., in a random access procedure) do not exist.

SUMMARY

The embodiments of the present disclosure is intended to provide an effective technical solution for activating/deactivating bandwidth parts. Specifically, the embodiments of the present disclosure provide a method and device for processing carrier activation at user equipment (UE).

According to a first aspect of the present disclosure, a method for processing carrier activation at user equipment (UE) is proposed. The method comprises: acquiring an indication related to deactivation of a currently activated carrier, wherein the carrier is a carrier in a carrier group consisting of a plurality of carriers; and if a random access procedure is ongoing, then ignoring the indication.

In some examples, acquiring an indication related to deactivation of a currently activated carrier may comprise: receiving a signaling indicating to deactivate a currently activated carrier.

In other examples, acquiring an indication related to deactivation of a currently activated carrier may comprise: receiving information, from a timer related to the deactivation of a currently activated carrier, indicating expiration of the timer.

In the case of using the timer above, in some examples, the method may further comprise: determining whether the timer is expired after a currently ongoing random access procedure is completed; and if the timer is expired, deactivating the currently activated carrier, and activating another carrier in the carrier group.

In some examples, the method may further comprise: stopping the timer related to deactivation of the currently activated carrier before initiating a random access procedure; and starting the timer after the random access procedure is completed.

In some examples, the method may further comprise: before initiating the random access procedure, deactivating the another carrier in the carrier group and activating the currently activated carrier, wherein the currently activated carrier supports the random access procedure and the another carrier does not support the random access procedure. After the random access procedure is completed, the currently activated carrier may be deactivated and another carrier may be activated.

In some examples, the method may further comprise: when changing a serving cell for the UE, reconfiguring the carriers in the carrier group, wherein the reconfigured carriers are initially in a deactivated state.

In some examples, the method may further comprise: deactivating the currently activated carrier when a media access control (MAC) layer of the UE is reset.

According to a second aspect of the present disclosure, a device for processing carrier activation is proposed. The device comprises an indication acquisition module and an indication processing module. The indication acquisition module is used for acquiring an indication related to deactivation of a currently activated carrier, wherein the carrier is a carrier in a carrier group consisting of a plurality of carriers. The indication processing module is used for ignoring the indication when a random access procedure is currently being executed.

According to a third aspect of the present disclosure, a device for processing carrier activation is further provided. The device comprises at least one processor and a memory communicatively connected to the at least one processor. The memory stores instructions executable by the at least one processor such that the at least one processor can execute any of the methods described above.

According to a fourth aspect of the present disclosure, a computer-readable storage medium is further provided. The computer-readable storage medium stores executable instructions. The instructions, when executed by a processor, enable the processor to execute any one of the methods described above.

With the above-mentioned technical solution, the interruption or failure of the random access procedure caused by the switching of bandwidth parts is avoided by preventing, for example, the deactivation of the bandwidth parts from being executed during the random access procedure.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
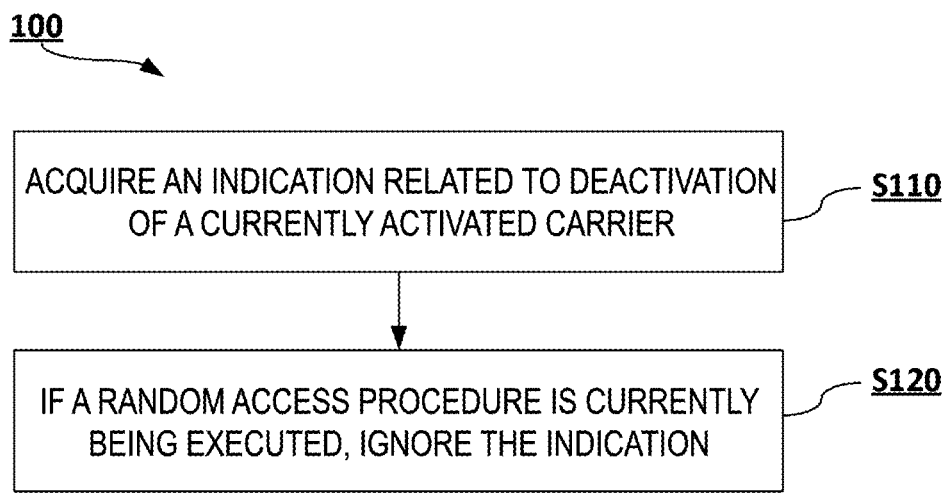
FIG. 1 illustrates a flowchart of an example of a method for processing carrier activation at UE according to an embodiment of the present invention.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the figures.

A plurality of embodiments according to the present disclosure are specifically described below by using an LTE mobile communications system and its subsequent evolved versions as an exemplary application environment. However, it is to be noted that the present disclosure is not limited to the following embodiments, but may be applied to other wireless communications systems.

Some concepts involved in the present disclosure are described below. It is worth noting that some names in the following description are merely illustrative of examples rather than limiting, and other names may be used.

Primary Cell: This refers to a cell that operates on a primary frequency. The primary cell is a cell where UE performs initial connection setup or initiates a connection reestablishment procedure, or is a primary cell instructed by a handover command. In the embodiment of the present disclosure, the primary cell may also refer to a primary secondary cell, i.e., a cell in a secondary cell group on which the UE is instructed to perform random access, or on which the initial PUSCH transmission is performed if a random access procedure is ignored when a secondary cell group is changed. For the primary secondary cell, a base station informs, through RRC signaling, the UE of its primary secondary cell identifier, frequency, and other primary secondary cell configuration information.

Secondary Cell: This refers to a cell for providing additional radio resources. The secondary cell is allocated to UE after a Radio Resource Control (RRC) connection is setup.

Serving Cell: This refers to a primary cell in non-carrier aggregation or non-dual-connectivity scenarios, and refers to all cells serving UE in carrier aggregation or dual-connectivity scenarios.

Bandwidth Part (BWP): In an NR system, operation may be performed on a broad bandwidth of up to 100 Mbps or even on the order of GHz. A Wideband carrier may be divided into a plurality of parts, which are referred to as bandwidth parts in a frequency domain. The bandwidth part is also called a carrier bandwidth part and comprises a group of consecutive physical resource block (PRB) sets. These PRBs are selected from consecutive subsets of carrier resource blocks with a certain carrier attribute (i.e., OFDM numerology, which is a carrier attribute defined by subcarrier spacing and CP type/length, specifically referring to Section 4.2 of 3GPP protocol specifications 38211) on a wideband carrier. The division of the bandwidth parts may be adapted to UE supporting different bandwidth ranges, and can also reduce energy consumption of the UE in transmission on a wideband carrier, and etc. Different bandwidth parts may or may not overlap. Different bandwidth parts can adopt different numerologies, for example, subcarrier spacing, TTI length, bandwidth, cyclic Prefix and others may be different.

In this disclosure, the BWP refers to an uplink BWP or a downlink BWP unless otherwise specified.

NR-PDCCH: This refers to a physical downlink control channel in NR (New Radio Physical Downlink Control Channel) used for transmitting downlink control information, and may also be referred to as a PDCCH for short.

NR-PDSCH: This refers to a physical downlink shared channel in NR (New Radio Physical Downlink Shared Channel) used for transmitting downlink data, and may also be referred to as a PDSCH for short.

NR-PUCCH: This refers to a physical uplink control channel in NR (New Radio Physical Uplink Control Channel) used for transmitting uplink control information, and may also be referred to as a PUCCH for short.

NR-PUSCH: This refers to a physical uplink shared channel in NR (New Radio Physical Uplink Shared Channel) used for transmitting uplink data. In some cases, it may also be used for transmitting uplink control information, such as an aperiodic channel state indicator. It can also be referred to as PUSCH for short.

Initial Active BWP: In a NR system, UE in an idle state or inactive state is generally considered to camp on an initial active BWP. The initial active BWP refers to an initial active downlink BWP and/or an initial active uplink BWP or an initial active BWP pair, and may be construed as the following: for UE, an available BWP before explicitly configuring or reconfiguring the BWPs during or after an RRC connection setup procedure. In general, for a given frequency band, the initial active BWP is limited within the minimum bandwidth of the UE. Preferably, the initial active BWP is generally used for an initial access process, but can also be continuously used after the initial access is completed. For a serving cell (such as a secondary cell), it may also be the first active BWP configured. Therefore, in the present disclosure, the initial active BWP may also be referred to as the first active BWP. In short, the initial active BWP refers to the first active BWP in a cell used by the UE.

Preferably, for a primary cell, the configuration of its initial active BWP is included in system information; and for a secondary cell, the configuration of its initial active BWP is included in RRC signaling containing secondary cell configuration information.

Default BWP: This includes a default uplink BWP and a default downlink BWP. After UE accesses a network using the initial active BWP, a base station may configure one or a plurality of BWPs to a serving cell of the UE through RRC-dedicated signaling such as an RRC (connection) reconfiguration message. The base station may configure one of these BWPs as the default BWP. Preferably, the default BWP contains a synchronization signal block (SSB). For the UE, if a serving cell is not configured with a default BWP, then the initial active BWP is considered as the default BWP. Preferably, when the default BWP is configured, the BWP with the BWP identifier of 0 is the default BWP. Alternatively, the BWP having explicit default BWP indication information is the default BWP. In general, the default BWP generally has a relatively smaller bandwidth, such that the UE can operate on the default BWP at a lower data rate for the purpose of saving energy; at a higher data rate, the UE can switch to operate on another configured BWP with a larger bandwidth to increase transmission efficiency.

BWP Activated/Deactivated State: A base station can configure a plurality of BWPs to UE. However, for the UE not all these configured BWPs can be used. The base station determines which BWPs the UE can currently use by controlling the activated/deactivated state of BWP. The BWP activated/deactivated state is for a specific UE. For an activated BWP, the UE considers it can be used. The UE can perform one or more of the following operations on the activated BWP: PDCCH monitoring, PDSCH reception, PUCCH transmission, PUSCH transmission, PRACH (Physical Random Access Channel) transmission, and the like. On a deactivated BWP, the UE performs one or more of the following operations: not transmitting uplink PUSCH (or UL-SCH), not transmitting PUCCH, not transmitting PRACH, not monitoring PDCCH, not receiving PDSCH, and when a BWP switching is performed, not flushing a HARQ (Hybrid Automatic Repeat Request) buffer. In the present disclosure, a BWP in the activation state is called an activated BWP, and a BWP in the deactivated state is called a deactivated BWP.

The NR system of version 15 only supports UE to have only one activated BWP at a time.

In the NR system, the activated/deactivated state of a BWP may be configured through RRC signaling, and a dynamic BWP switching is also supported. By a dynamic BWP switching, an activated BWP currently in use may be deactivated and/or a BWP currently in the deactivated state may be activated. Preferably, deactivating an activated BWP and activating a deactivated BWP may occur simultaneously, for example, by executing the same signaling; and alternatively, deactivating an activated BWP and activating a deactivated BWP may not occur simultaneously, for example, an activated BWP is deactivated by executing a signaling, whereas a deactivated BWP is activated by executing another signaling. There are two types of dynamic BWP switching: BWP switching indicated by downlink control information (DCI) signaling and BWP switching based on a timer. The DCI signaling is carried on a PDCCH channel, and the base station instructs, through the DCI signaling, the UE to deactivate an activated BWP currently in use and/or activate a BWP currently in the deactivated state. In the timer-based BWP switching mechanism, the UE starts the timer when switching to an activated BWP different from the default BWP; when a DCI is successfully decoded on the currently activated BWP, the timer is restarted; and when the timer is expired, then the UE switches to the default BWP for transmission and the activated BWP is considered as the default BWP. The timer may be referred to as a BWP inactivity timer or a BWP deactivation timer, but the name is only illustrative and is not limited to these two names.

The following embodiment describes a BWP activated/deactivated state maintenance/determining method in different scenarios. In the present disclosure, the BWP activated/deactivated state is also referred to as BWP state for short. The following UE may specifically refer to the media access control (MAC) layer or MAC entity of the UE, and may also refer to the RRC layer of the UE.

FIG. 1 illustrates a flowchart of an example of a method 100 for processing carrier activation at UE according to an embodiment of the present invention.

As shown in FIG. 1, in Operation S110, an indication related to deactivation of a currently activated carrier is acquired, wherein the carrier is a carrier in a carrier group consisting of a plurality of carriers.

The carrier described herein may be the aforementioned BWP, and the carrier group may be a wideband carrier comprising a plurality of BWPs. However, it should be noted that the technical solution of the embodiment of the present invention is not limited to the wideband carrier scenario in the aforementioned NR technology, but may be applied to any other scenario where carrier change may occur.

In some examples, acquiring an indication related to deactivation of a currently activated carrier may comprise: receiving a signaling, from a network-side device (e.g., a base station), indicating to deactivate a currently activated carrier. For example, the UE may acquire, through DCI signaling transmitted by the network side, an indication for deactivating the currently activated carrier. Certainly, in some other examples, the deactivation of a carrier (e.g., BWP) may be notified by using other signaling methods.

In other examples, acquiring an indication related to deactivation of a currently activated carrier may comprise: receiving information, from a timer related to deactivation of the currently activated carrier, indicating expiration of the timer. The timer described herein may be the BWP inactivity timer or BWP deactivation timer described above, or any timer having another name but capable of implementing a similar function.

Then, in Operation S120, if a random access procedure is ongoing, then the indication is ignored.

In the case of using the timer above, in some examples, the method may further comprise: determining whether the timer is expired after an ongoing random access procedure is completed. If the timer is expired, the currently activated carrier is deactivated, and another carrier in the carrier group is activated. In some examples, the "another carrier" may be a default carrier, while in other examples, the "another carrier" may also be a carrier specified in any other ways.

In some examples, the method may further comprise: stopping the timer related to deactivation of the currently activated carrier before initiating a random access procedure, such as the BWP inactivity timer or BWP deactivation timer described above. The timer is then started after the random access procedure is completed. In this way, operations caused by determining the expiration of the timer and the like at the UE may be avoided.

In some examples, the method may further comprise: before initiating the random access procedure, deactivating the another carrier in the carrier group and activating the currently activated carrier, wherein the currently activated carrier supports the random access procedure and the another carrier does not support the random access procedure. Such an operation may occur when a carrier (e.g., BWP) activated before the initiation of the random access procedure cannot support the random access procedure. Subsequently, after the random access procedure is completed, the currently activated carrier may be deactivated and the another carrier is activated, thus the carrier used before the initiation of the random access procedure may be continuously used.

In some examples, the method may further comprise: when changing a serving cell for the UE, reconfiguring the carriers in the carrier group, wherein the reconfigured carriers are initially in a deactivated state.

In some examples, the method may further comprise: deactivating the currently activated carrier when a media access control (MAC) layer of the UE is reset.

Figure 2:
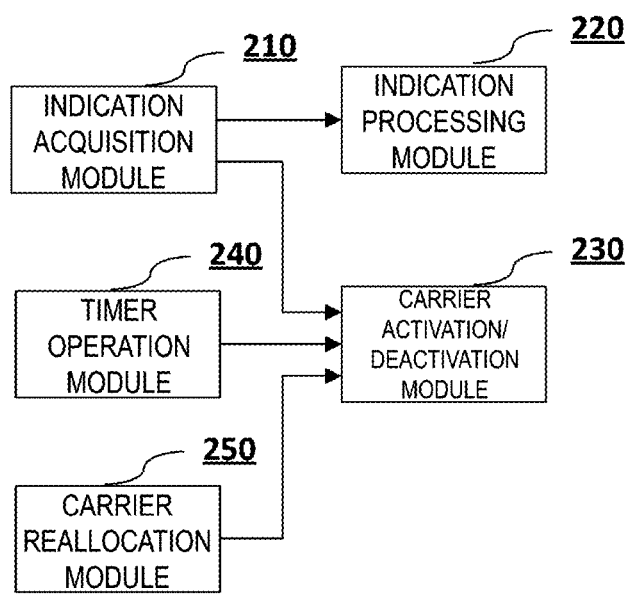
FIG. 2 illustrates a schematic block diagram of a device for processing carrier activation for implementing the method shown in FIG. 1.

FIG. 2 illustrates a schematic block diagram of a device for processing carrier activation for implementing the method shown in FIG. 1.

As shown in FIG. 2, the device comprises an indication acquisition module 210 and an indication processing module 220.

The indication acquisition module 210 is used for acquiring an indication related to deactivation of a currently activated carrier, wherein the carrier is a carrier in a carrier group consisting of a plurality of carriers.

The indication processing module 220 is used for ignoring the indication when a random access procedure is ongoing.

The carrier described herein may be the aforementioned BWP, and the carrier group may be a wideband carrier comprising a plurality of BWPs. However, it should be noted that the technical solution of the embodiment of the present invention is not limited to the wideband carrier scenario in the aforementioned NR technology, but may be applied to any other scenario where carrier change may occur.

In some examples, the indication acquisition module 210 may receive a signaling indicating to deactivate a currently activated carrier. For example, the indication acquisition module 210 may acquire, through DCI signaling transmitted by the network side, an indication for deactivating the currently activated carrier. Certainly, in some other examples, other signaling methods may be used to indicate that a carrier (e.g., BWP) will be deactivated.

In other examples, the indication acquisition module 210 may receive, from a timer related to deactivation of the currently activated carrier, information indicating the expiration of the timer. The timer described herein may be the BWP inactivity timer or BWP deactivation timer described above, or any timer having another name but capable of implementing a similar function.

In the case of using the timer above, in some examples, the indication acquisition module 210 may further determine whether the timer is expired after an ongoing random access procedure is completed. The device shown in FIG. 2 may further comprise a carrier activation/deactivation module 230 configured to deactivate the currently activated carrier and activate another carrier in the carrier group when the timer is expired. In some examples, the "another carrier" may be a default carrier, while in other examples, the "another carrier" may also be a carrier specified in any other ways.

In some examples, the device shown in FIG. 2 may further comprise a timer operation module 240 configured to stop the timer related to deactivation of the currently activated carrier before initiating a random access procedure, such as the BWP inactivity timer or BWP deactivation timer described above. Then, after the random access procedure is completed, the timer operation module 240 can start/restart the timer. In this way, operations caused by determining the expiration of the timer and the like at the UE may be avoided.

In some examples, the carrier activation/deactivation module 230 may further be configured to deactivate the another carrier in the carrier group and activate the currently activated carrier before initiating the random access procedure, wherein the currently activated carrier supports the random access procedure and the another carrier does not support the random access procedure. Such an operation may occur when a carrier (e.g., BWP) activated before the initiation of the random access procedure cannot support the random access procedure. After that, after the random access procedure is completed, the carrier activation/deactivation module 230 may deactivate the currently activated carrier and activate the another carrier, thus the carrier used before the initiation of the random access procedure may be continuously used.

In some examples, the device shown in FIG. 2 may further comprise a carrier reconfiguration module 250 which is configured to reconfigure the carriers in the carrier group when changing a serving cell for the UE. In this case, the carrier activation/deactivation module 230 initially sets the reconfigured carriers to the deactivation state.

In some examples, the carrier activation/deactivation module 230 may also deactivate the currently activated carrier when a media access control (MAC) layer of the UE is reset.

The embodiments shown in FIGS. 1 and 2 will be described in detail below based on specific scenarios. It should be noted that although the following specific examples are described in relation to wideband carriers in the NR technology, they can also be applied to any other scenarios where carrier change may occur. Therefore, the technical solutions for wideband carriers and BWPs described below are equally applicable to a carrier group including a plurality of carriers and the carriers included therein.

Method for Activating/Deactivating BWP in Random Access Procedure

Embodiment 1

In existing BWP switching mechanisms, UE may perform BWP switching while performing a random access procedure, i.e., deactivating an activated BWP on which the random access procedure is performed, and/or activating a deactivated BWP. Considering that the execution of BWP deactivation in the random access procedure may lead to interruption or failure of the ongoing random access procedure, the present embodiment proposes a method for preventing BWP switching from deactivating a currently activated BWP in the random access procedure.

After the UE initiates the random access procedure, the UE may perform one or a plurality of the following operations:

Operation 1: ignoring received DCI signaling that used to deactivate the currently activated BWP before the (ongoing) random access procedure is completed.

In this operation, ignoring the received DCI signaling used to deactivate the currently activated BWP can also be expressed as ignoring the received DCI signaling for BWP switching. "Ignore" used herein may also be expressed as "not execute", "abandon", or any other terms that include the meaning of not executing the received signaling. Completion of the random access procedure used herein may refer to successful completion of the random access procedure, and may refer to the unsuccessful completion of the random access procedure as well as failure of the random access procedure.

Operation 2: ignoring the state of the BWP inactivity timer before the random access procedure is completed.

In this operation, ignoring the state of the BWP inactivity timer can also be expressed as ignoring determination of whether the timer is expired. At this point, the BWP inactivity timer is still in operation, but the UE does not determine whether the timer is expired. Even if the timer is expired, the UE ignores or does not perform the operation subsequent to the expiration of the timer (for example, switching its activated BWP to a default BWP). For example, even when the timer is expired and information related to the expiration is transmitted, the UE does not process this information. The completion of the random access procedure may refer to the successful completion of the random access procedure, and may refer to the unsuccessful completion of the random access procedure as well as the failure of the random access procedure.

Optionally, ignoring the state of the BWP inactivity timer further comprises not starting or restarting the timer.

Operation 3: When the random access procedure is completed (or after random access procedure is completed), the UE determines whether to switch its activated BWP to a default BWP according to the state of BWP inactivity timer.

If the BWP inactivity timer is expired, then the UE deactivates the currently activated BWP and considers the default BWP as its activated BWP, i.e. switching its activated BWP to the default BWP. Optionally, if the BWP inactivity timer is expired, then the UE continues to use the currently activated BWP as its activated BWP.

This operation is equivalent to the UE switching its activated BWP to the default BWP when the BWP inactivity timer is expired and the UE does not currently have an ongoing random access procedure.

Optionally, in the embodiment, in the random access procedure, the UE receives a random access response (RAR) on its currently activated BWP, or the UE receives an RAR on a downlink BWP configured by the base station for receiving the RAR. In the latter, the UE will be configured with downlink BWP information (e.g., BWP identifier) required to receive an RAR. Thus, when a plurality of BWPs are configured, the UE can receive an RAR on the determined downlink BWP for receiving an RAR.

Embodiment 2

The present embodiment proposes a method for preventing BWP switching from deactivating a currently activated BWP in the random access procedure.

When UE initiates a random access procedure, the UE performs the following operation:
Stopping the BWP inactivity timer.

When the random access procedure is completed, the UE performs the following operation:
starting the BWP inactivity timer.

Specifically, the initiation of random access procedure described herein may refer to initiating a random access procedure on an activated BWP which is not the default BWP. The completion of the random access procedure may refer to the successful completion of the random access procedure, and may refer to the unsuccessful completion of the random access procedure as well as the failure of the random access procedure.

Embodiment 3

When a plurality of BWPs are configured, not all the BWPs are configured with random access resources (PRACH resources and/or RARs). When the currently activated BWP of the UE is not configured with random access resources, the UE needs to switch to another BWP configured with random access resources to perform a random access procedure before performing the random access procedure, such as switching to a default BWP to perform the random access procedure. In this case, the present embodiment proposes a method for BWP switching after completion of the random access for UE.

In this embodiment, the activated BWP before executing the random access procedure is called a previously activated BWP of the UE, and the BWP performing the random access procedure is called a random access BWP.

In one implementation, for a non-contention-based random access procedure performed by UE, when the UE receives a downlink allocation on a PDCCH addressed by a RA-RNTI (Random Access-Radio Network Temporary Identifier) used by the random access procedure and successfully decodes the transmission block (i.e., RAR) in the downlink allocation, if the RAR contains a random access preamble identifier corresponding to a random access preamble transmitted by the UE, the UE or the MAC entity of the UE performs the following operation:
Determining that the uplink grant contained in PDCCH transmission (or RAR) is valid only for the previously activated BWP.

Through this implementation, the UE returns to the previously activated BWP for data transmission after completing the random access procedure, i.e., determining the previously activated BWP as an activated BWP. The non-contention-based random access procedure means that the random access preamble transmitted by the random access procedure is not selected by the MAC entity but is indicated by signaling received from a base station.

In one implementation, for a contention-based random access procedure performed by UE, after a message 3 is transmitted, if an indication from the lower layer indicating PDCCH transmission has been received has been received; if the message 3 contains a C-RNTI (Cell-Radio Network Temporary Identifier) Media Access Control element; and if the random access procedure is initiated by the MAC layer or RRC layer and the PDCCH transmission is addressed by a C-RNTI and contains an uplink grant for new transmission, or the random access procedure is triggered by a PDCCH command and addressed by the C-RNTI, then the UE or the MAC entity of the UE performs the following operation:
Determining that the uplink grant or downlink allocation contained in PDCCH transmission is valid only for the previously activated BWP.

Through this implementation, the UE returns to the previously activated BWP for data transmission after completing the random access procedure, i.e., determining the previously activated BWP as an activated BWP. The contention-based random access procedure means that the random access preamble transmitted by the random access procedure is selected by the MAC entity.

In another implementation, for a non-contention-based random access procedure performed by UE, when the UE receives a downlink allocation on a PDCCH scrambled by a RA-RNTI used by the random access procedure and successfully decodes the transmission block (i.e., RAR) in the downlink allocation, if the RAR contains a random access preamble identifier corresponding to a random access preamble transmitted by the UE, the UE or the MAC entity of the UE performs the following operation:

Determining that the uplink grant contained in PDCCH transmission (or RAR) is valid only for a BWP indicated by the PDCCH transmission or RAR.

Through this implementation, after completing the random access procedure, the UE switches to the BWP indicated by the RAR or the PDCCH corresponding to the RAR for data transmission, i.e., determining the BWP indicated by the RAR or the PDCCH corresponding to the RAR as an activated BWP. The non-contention-based random access procedure means that the random access preamble transmitted by the random access procedure is not selected by the MAC entity but is indicated by signaling received from a base station.

In one implementation, for a contention-based random access procedure performed by UE, after a message 3 is transmitted, if an indication coming from the lower layer which indicates that PDCCH transmission has been received is received; if the message 3 contains a C-RNTI MAC element; and if the random access procedure is initiated by the MAC layer or RRC layer and the PDCCH transmission is addressed by a C-RNTI and contains an uplink grant for new transmission, or the random access procedure is triggered by a PDCCH command and addressed by the C-RNTI, then the UE or the MAC entity of the UE performs the following operation:

Determining that the uplink grant or downlink allocation contained in PDCCH transmission is valid only for a BWP indicated by the PDCCH transmission.

Through this implementation, the UE transmits data on the BWP indicated by the PDCCH transmission after completing the random access procedure, i.e., determining the BWP indicated by the PDCCH transmission as an activated BWP. The non-contention-based random access procedure means that the random access preamble transmitted by the random access procedure is not selected by the MAC entity.

Method for Deactivating BWP Upon Cell Change

Embodiment 4

The present embodiment provides a method for deactivating BWPs in a cell change scenario.

In this embodiment, UE performs the following operations to perform reconfiguration with synchronization:

Determining that the configured BWP is in the deactivation state; and

Stopping the BWP inactivity timer (if it is running).

The aforementioned operation can also be described as follows: if the UE is configured with a BWP, then the BWP is considered as deactivated. In the aforementioned operation, "determining that the configured BWP is in the deactivated state" can also be described as "considering that the configured BWP is in the deactivated state".

The configured BWP may be a BWP of a primary cell or a BWP of a primary secondary cell. The allocated BWP includes a default BWP, and further refers to a BWP configured in a BWP configuration included in a "servingcellconfigdedicated" information element. Alternatively, the BWP also refers to a BWP configured to another serving cell including a secondary cell.

Optionally, the UE operation described in the present embodiment can also occur when RRC connection is released, that is, the operation may be described as follows: the UE performs the aforementioned operation after the UE receives a RRC connection release message; or after the UE receives a RRC connection release message indicating the UE to enter into an idle state (RRC_idle state); or when the UE leaves the RRC connected state (RRC_connected state); or when the UE leaves the RRC inactive state (RRC_inactive state). Optionally, the operation further comprises the UE releasing the configured BWP configuration.

Method for Deactivating BWP During MAC Reset

Embodiment 5

The present embodiment provides a method for deactivating BWPs during MAC reset.

In this embodiment, if the MAC entity reset is requested by the upper layer, then the UE or the MAC entity of the UE performs one or more of the following operations:

Stopping the BWP inactivity timer (if it is running); or considering that the BWP timer expires; and Deactivating the corresponding BWP.

Deactivating the corresponding BWP refers to deactivating the BWP corresponding to the MAC entity, such as deactivating the BWP corresponding to the cell corresponding to the MAC entity, or refers to deactivating all corresponding BWPs of the UE. Alternatively, the BWPs described in the present embodiment may not include the default BWP.

Method for Managing BWP Inactivity Timer

Embodiment 6

The present embodiment provides a method for processing the BWP inactivity timer.

In the present embodiment, when the UE receives a DCI command for BWP switching and the UE is requested to switch its activated BWP to the default BWP, the UE performs the following operation:

Stopping the BWP inactivity timer.

That is, when the activated BWP of the UE is switched to the default BWP, the UE stops the BWP inactivity timer.

Another description of the present embodiment is the following: when the UE considers its activated BWP is the default BWP, then the BWP inactivity timer is not applicable.

Figure 3:
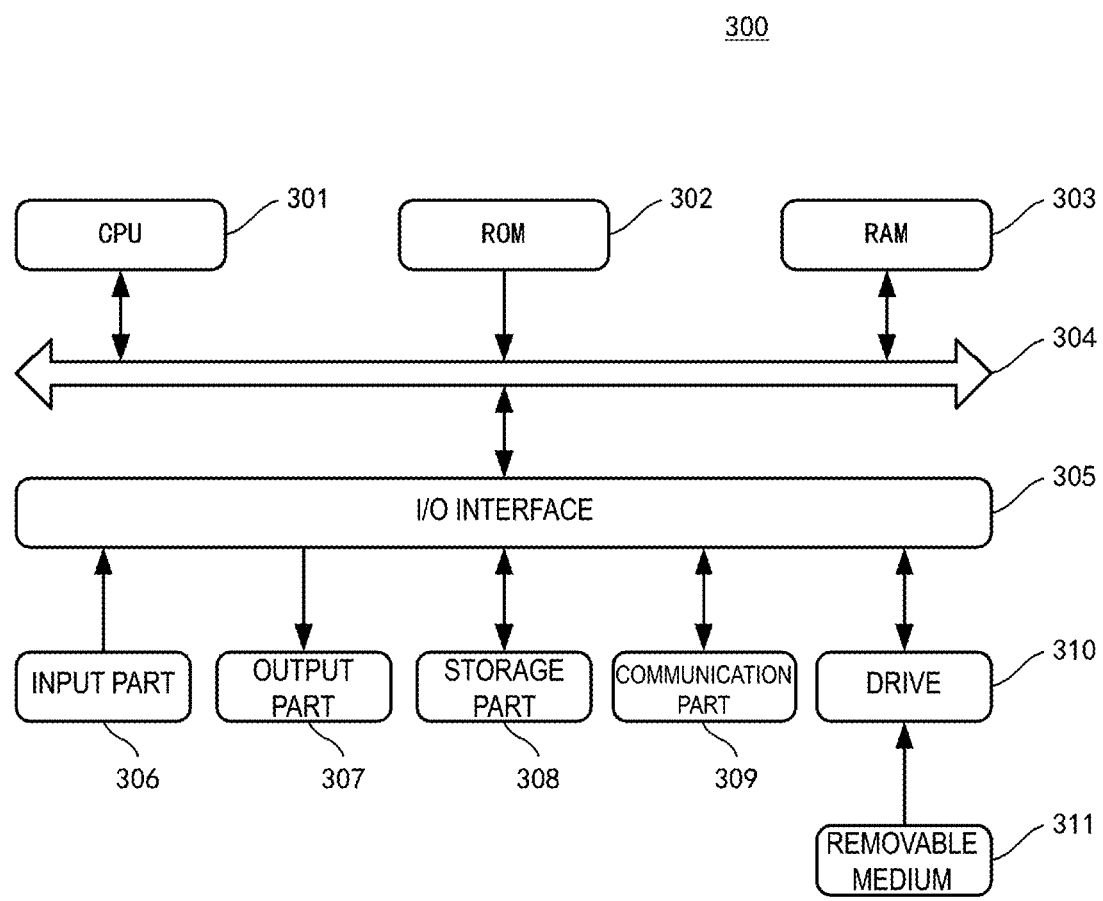
FIG. 3 schematically illustrates a schematic block diagram of a device for processing carrier activation and deactivation according to an embodiment of the present disclosure.

FIG. 3 schematically shows a schematic block diagram of a device 300 for implementing the method for activating and deactivating carriers according to an embodiment of the present disclosure. The device shown in FIG. 3 may correspond to the device shown in FIG. 2 (e.g., user equipment). It should be noted that the device shown in FIG. 3 is only illustrative and does not impose any limitation on the functionality and application scope of the embodiments of the present disclosure.

As shown in FIG. 3, the device 300 according to the embodiment comprises a central processing unit (CPU) 301 that can perform various appropriate actions and processes according to a program stored in a read-only memory (ROM) 302 or a program loaded into a random access memory (RAM) 303 from a storage part 308. In the RAM 303, various programs and data required by the operation of the device 300 are also stored. The CPU 301, the ROM 302, and the RAM 303 are connected to one other through a bus 304. An input/output (I/O) interface 305 is also connected to the bus 304.

The device 300 may also comprise one or more of the following components connected to the I/O interface 305: an input part 306 including a keyboard, a mouse, and the like; an output part 307 including a cathode-ray tube (CRT), a liquid crystal display (LCD), and the like, and a speaker and the like; a storage part 308 including a hard disk and the like; and a communication part 309 including a network interface card such as an LAN card, a modem, and the like. The communication part 309 performs communication processing via a network such as the Internet. A drive 310 is also connected to the I/O interface 305 as needed. A removable medium 311, such as a magnetic disk, an optical disk, a magneto-optical disc, a semiconductor memory, and the like, is mounted on the drive 310 as needed, such that a computer program read therefrom may be installed into the storage part 308 as needed.

In particular, according to the embodiments of the present disclosure, the process described above with reference to the flowchart may be implemented as a computer software program. For example, the embodiments of the present disclosure include a computer program product, comprising a computer program carried on a computer-readable medium, the computer program consisting of program codes for executing the method shown in the flowchart. In such embodiments, the computer program may be downloaded and installed from the network through the communication part 309 and/or installed from the removable medium 311. When the computer program is executed by the central processing unit (CPU) 301, the aforementioned function defined in the device of the embodiment of the present disclosure are implemented.

It should be noted that the computer-readable medium shown in the present disclosure may be a computer-readable signal medium or a computer-readable storage medium, or any combination of both. For example, the computer-readable storage medium may be, but is not limited to, an electrical, magnetic, optical, electromagnetic, infrared, or semiconductor system, apparatus or device, or any combination thereof. More specific examples of the computer-readable storage medium may include, but are not limited to, an electrical connection with one or a plurality of wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program, and the program may be used by or in combination with an instruction execution system, apparatus, or device. In the present disclosure, the computer-readable signal medium may comprise data signals propagated in a baseband or as part of a carrier, wherein computer-readable program codes are carried. Such propagated data signals may take a variety of forms including, but not limited to, electromagnetic signals, optical signals, or any suitable combination of the above. The computer-readable signal medium may also be any computer-readable medium other than the computer-readable storage medium, and the computer-readable medium can send, propagate or transmit a program for use by or in combination with the instruction execution system, device or device. The program codes contained in the computer-readable medium may be transmitted using any suitable medium including, but not limited to, a wireless connection, a wire, an optical cable, an RF signal, etc., or any suitable combination of the above.

In the present application, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by a Medium Access Control (MAC) entity of a user equipment (UE), the method comprising:
stopping a BWPinactivitytimer if a random access procedure is initiated;
starting the BWPinactivitytimer upon successful completion of the Random Access procedure on an active BWP, wherein the active BWP is not a default BWP; and
switching to the default BWP if the BWPinactivitytimer expires.

2. A user equipment (UE) comprising:
a processor; and
a memory, wherein the memory stores instructions that cause the processor to:
cause a Medium Access Control (MAC) entity of the UE to stop a BWPinactivitytimer, if a random access procedure is initiated;
cause the MAC entity to start the BWPinactivitytimer, upon successful completion of the Random Access procedure on an active BWP, wherein the active BWP is not a default BWP; and
cause the MAC entity to perform switching to the default BWP, if the BWPinactivitytimer expires.

3. The method according to claim 1, wherein the BWPinactivitytimer stopped when the Random Access procedure is initiated remains stopped until the successful completion of the Random Access procedure.

4. The UE according to claim 2, wherein the BWPinactivitytimer stopped when the Random Access procedure is initiated remains stopped until the successful completion of the Random Access procedure.

5. The UE according to claim 2, wherein
the active BWP is configured for a primary cell, and
the default BWP is configured for the primary cell.

* * * * *